(12) United States Patent
Choi et al.

(10) Patent No.: US 7,688,516 B2
(45) Date of Patent: Mar. 30, 2010

(54) HEAD-UP DISPLAY DEVICE FOR VEHICLES

(75) Inventors: Ho Young Choi, Yongin-si (KR); Tea Jeong Ahn, Goyang-si (KR); Sang Keun Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 12/115,924

(22) Filed: May 6, 2008

(65) Prior Publication Data
US 2008/0278822 A1    Nov. 13, 2008

(30) Foreign Application Priority Data
May 11, 2007  (KR) .................... 10-2007-0046104
Jan. 7, 2008  (KR) .................... 10-2008-0001688

(51) Int. Cl.
*G02B 27/14* (2006.01)
*G09G 5/00* (2006.01)
(52) U.S. Cl. .......................... 359/631; 345/7
(58) Field of Classification Search ......... 359/629–634; 345/7–9
See application file for complete search history.

(56) References Cited

U.S. PATENT DOCUMENTS

| | | | | |
|---|---|---|---|---|
| 4,582,389 | A * | 4/1986 | Wood et al. ................. | 359/631 |
| 5,519,410 | A * | 5/1996 | Smalanskas et al. ........... | 345/7 |
| 5,724,189 | A * | 3/1998 | Ferrante ..................... | 359/634 |
| 7,508,356 | B2 * | 3/2009 | Kanamori et al. .............. | 345/7 |

FOREIGN PATENT DOCUMENTS

| | | |
|---|---|---|
| JP | 62-225429 | 10/1987 |
| JP | 04-056633 | 2/1992 |
| KR | 10-1997-0701363 | 3/1997 |
| KR | 10-1999-0069156 | 9/1999 |

OTHER PUBLICATIONS

Notice of Allowance issued by Korean Intellectual Property Office dated Mar. 17, 2009, no translation.
Korean Office Action dated Sep. 30, 2008, no translation.
* cited by examiner

*Primary Examiner*—Alicia M Harrington
(74) *Attorney, Agent, or Firm*—KED & Associates, LLP

(57) ABSTRACT

Disclosed is a head-up display device for vehicles. The display device for vehicles includes a panel, on which driving data of a vehicle are displayed; and an aspheric combiner, which magnifies the driving data displayed on the panel and thus creates a virtual image, and has a ratio of DISC to CRC satisfying the below expression (here, $0<|DISC/CRC|<1.0$, DISC representing the distance on an optical route between the panel and the combiner, and CRC representing the radius of curvature of the combiner).

18 Claims, 3 Drawing Sheets

HEAD-UP DISPLAY DEVICE FOR VEHICLES

This application claims the benefit of Korean Patent Application No. 10-2007-0046104, filed May 11, 2007 and Korean Patent Application No. 10-2008-0001688, filed Jan. 7, 2008, which are hereby incorporated by reference as if fully set forth herein.

BACKGROUND OF THE INVENTION

1. Field of the Invention

The present invention relates to a display device, and more particularly, to a head-up display device for vehicles.

2. Discussion of the Related Art

In order to transmit a large amount of text or image data, the demand for electronic display devices displaying video images, graphic characters, characters, etc. rapidly increases. Recently, an attempt to produce a mass of displays, which are handy to carry and realize a large-sized screen, is made. Further, portable personal display devices having a small size displays a large-sized screen, and head-up display (HUD) products, which are used during driving of a vehicle, requires a device having a compact constitution and realizing a large-sized screen.

While driving, a driver must observe articles coming in sight and check driving state of a vehicle (velocity, RPM, direction, etc.). Therefore, the necessity of a head-up display (hereinafter, referred to as "HUD") as a medium for providing safety to the driver and effectively transmitting vehicle driving data and peripheral circumstantial data to the driver increases.

HUDs are systems, which provide vehicle driving data or other data in a range not deviating from the front of a driver, i.e., a main line of driver's sight, during driving of a vehicle or an airplane.

The HUDs in its early stage were developed with the object of being attached to an airplane, particularly a fighter to provide flying data to a pilot during flying. Devices, which were developed so as to apply this principle to vehicles, are HUDs for vehicles.

While a driver drives his/her vehicle at a velocity of approximately 100 km/h, the vehicle moves to a distance of approximately 55 m at the time (2 seconds) when a driver fixes his/her sight from a gauge cluster to a road, and thus may cause danger. One method for reducing this danger is the development of HUDs for vehicles. The HUDs for vehicles display data (velocity, distance covered, RPM, etc.) of a gauge cluster on a main line of driver's sight of a front glass window, such that the driver can easily get driving data during driving. Thereby, the driver perceives important driving data with keeping his/her eyes on the road, and thus performs safe driving.

Here, the above conventional HUD system has problems, as below.

FIG. 1 is a schematic view of a conventional HUD. As shown in FIG. 1, the conventional HUD includes a panel 10 for displaying driving data transmitted from an internal system of a vehicle, a fold mirror 20 for transmitting the driving data in a desired direction, a concave mirror 30 for reflecting and magnifying the driving data, and a wind shield 40 projecting for image data magnified by the concave mirror 30 to a driver, etc. Therefore, the conventional HUD creates a virtual image within the range of a driver's main visual field, and thus provides the driving data to the driver.

Therefore, the conventional HUD for creating the virtual image includes a large number of components for reflecting the driving data, thus increasing the volume of a HUD product and being high-priced. Further, the shaking of the reflected data is accumulated due to the vibration of a vehicle during driving, and thus the image quality of the HUD is deteriorated. Further, the conventional HUD cannot increase a magnifying power any more due to the limit in the volume of the product, and requires a cooling system so as to reduce the rise of the temperature when a large-sized panel is used, thereby causing a difficulty in obtaining reliability, and being high-priced.

Further, the conventional panel 10 has the resolution of a Video Graphics Array (VGA) grade, and displays driving data of the VGA grade in a visible region using the whole resolution, thus causing a problem of limiting the position of driver's eyes.

Accordingly, in order to obtain driving data through the above HUD, a driver must maintain his/her eyes to the fixed visible region.

SUMMARY OF THE INVENTION

Accordingly, the present invention is directed to a head-up display device for vehicles.

One object of the present invention is to provide a display device, which has a compact and simple constitution and creates a large-sized virtual image.

Another object of the present invention is to provide a head-up display device for vehicles, which magnifies a driver's visible region to the head-up display device such that a driver can conveniently obtain driving data.

To achieve this object and other advantages and in accordance with the purpose of the invention, as embodied and broadly described herein, a display device includes a panel, on which image data are displayed; and a combiner, which magnifies and reflects the image data displayed on the panel, and has a ratio of DISC to CRC satisfying the below expression. (Here, $0<|DISC/CRC|<1.0$, DISC representing the distance on an optical route between the panel and the combiner, and CRC representing the radius of curvature of the combiner)

In another aspect of the present invention, a display device for vehicles includes a panel, on which driving data of a vehicle are displayed; and an aspheric combiner, which magnifies the driving data displayed on the panel and thus creates a virtual image, and has a ratio of DISC to CRC satisfying the below expression. (Here, $0<|DISC/CRC|<1.0$, DISC representing the distance on an optical route between the panel and the combiner, and CRC representing the radius of curvature of the combiner)

In yet another aspect of the present invention, a head-up display device for vehicles includes a panel displaying driving image data of a vehicle; a lens magnifying and projecting the driving image data displayed on the panel; and a mirror projecting the magnified and projected driving image data to a driver and thus creating a virtual image, wherein the panel has a resolution differing from the resolution of the driving image data.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
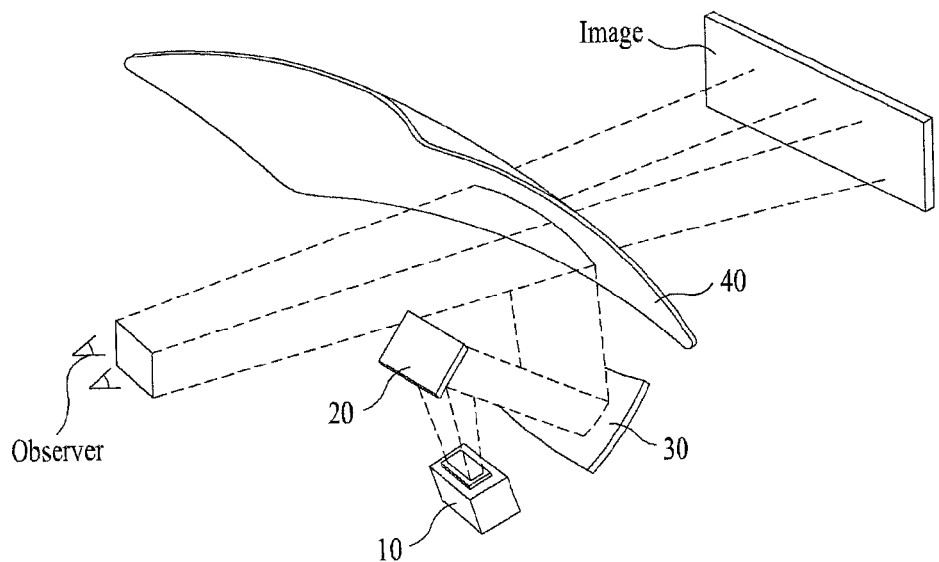
FIG. 1 is a schematic view of a conventional HUD.

Reference will now be made in detail to the preferred embodiments of the present invention, examples of which are illustrated in the accompanying drawings. Wherever possible, the same reference numbers will be used throughout the drawings to refer to the same or like parts.

In the drawings, the thickness of layers and regions are exaggerated for clarity, and a thickness ratio of between respective layers does not indicate the actual thickness ratio.

Figure 2:
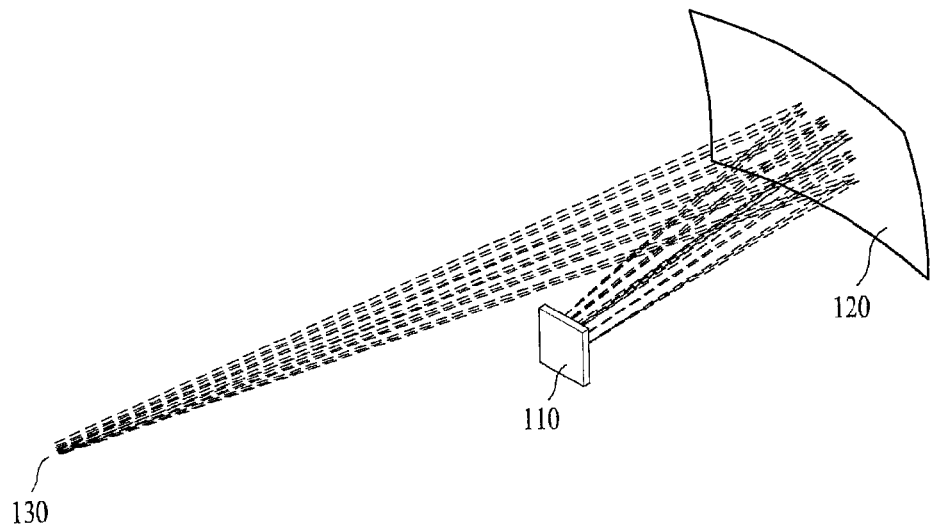
FIG. 2 is a schematic view of a display device in accordance with one embodiment of the present invention.

FIG. 2 is a schematic view of a display device in accordance with one embodiment of the present invention. Hereinafter, with reference to FIG. 2, the display device in accordance with one embodiment will be described.

The display device in accordance with this embodiment includes a panel 110, on which image data are displayed, and a combiner 120, which magnifies and projects the image data displayed on the panel 110. Here, the panel 110 is any one of emission type, transmission type, and reflection type displays. The emission type displays include an organic EL and an inorganic EL, the transmission type displays include an LCD, and the reflection type displays include a DLP, and an LCOS.

The combiner 120 is aspheric. In order to create a large-sized virtual image, a spheric combiner is used, and the curvature of the combiner is enlarged. However, it is limited to increase the magnifying power of the virtual image using the spheric combiner, and distortion is high and thus it is difficult to implement a high performance. Further, when the distance between the panel and the combiner is increased in order to increase the magnifying power of the virtual image, components increase in size and the entire system suddenly increases in size, and thus a compact constitution cannot be realized. Particularly, when the conventional spheric reflecting mirror is used, the resolution of the virtual image at the edge may be noticeably lowered.

Thus, in this embodiment, the aspheric combiner 120 is used, and magnifies image data projected from the panel 110 in the non-axial direction and reflects the magnified image data. Further, the aspheric combiner 120 has a concave shape so as to provide a magnified virtual image to an observer 130. When the display device of this embodiment is used as a HUD, it is preferable that the display device achieves a high magnifying power. Particularly, the display device must create a virtual image of a high magnifying power of 10 or more without generating distortion.

Here, in order to minimize distortion, the display device must satisfy the below condition.

$$0.01 < |CRC/DISV| < 0.5 \quad \text{[Expression 1]}$$

Here, CRC represents the radius of curvature of the combiner, and DISV represents the distance between the observer and a virtual image creating position. That is, the absolute value of the ratio of the radius of curvature of the combiner to the distance between the observer and the virtual image creating position must be larger than 0.01 and be smaller than 0.5.

Further, CRC is generally 500~2,000 mm. In the case that CRC is 500 mm, when the value of |CRC/DISV| is 0.1~0.5, a virtual image is created at a position of 1~5 meters ahead of an observer. Here, when the value of |CRC/DISV| is less than 0.1, the virtual image is created at a position excessively distant from the visual field of the observer, and when the value of |CRC/DISV| is more than 0.5, the virtual image is created at a position excessively close to the visual field of the observer. In order to obtain a high magnifying power, the display device must satisfy the below condition.

$$0 < |DISC/CRC| < 1.0 \quad \text{[Expression 2]}$$

Here, DISC represents the distance on an optical route between the panel and the combiner. That is, the absolute value of the ratio of the distance on the optical route between the panel and the combiner to the radius of curvature of the combiner must be larger than 0 and be smaller than 1.0.

As described above, CRC is generally 500~2,000 mm. In the case that CRC is 500 mm, when DISC is 200~500 mm, a high magnifying power can be realized. Thus, preferably, when the value of |DISC/CRC| is 0.4~1.0, a virtual image of a high magnifying power is obtained. Here, when the value of |DISC/CRC| is less than 0.4, an excessively large virtual image is created, and when the value of |DISC/CRC| is more than 1.0, no virtual image is created.

Figure 3:
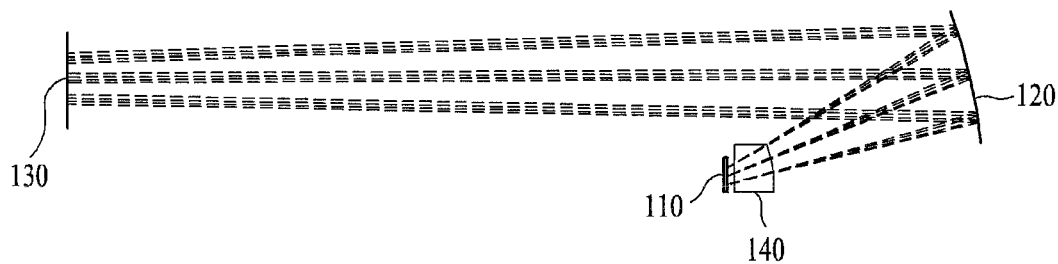
FIG. 3 is a schematic view of a display device in accordance with another embodiment of the present invention.

Further, as shown in FIG. 3, a first optical element 140 may be provided between the panel 110 and the combiner 120. Here, the first optical element 140 refracts or reflects the image data displayed on the panel 110 and thus changes the traveling route of light, and projects the light onto the aspheric combiner 120. By using the first optical element 140, it is possible to change the route of light and thus to allow the display device to have a small size.

Figure 4:
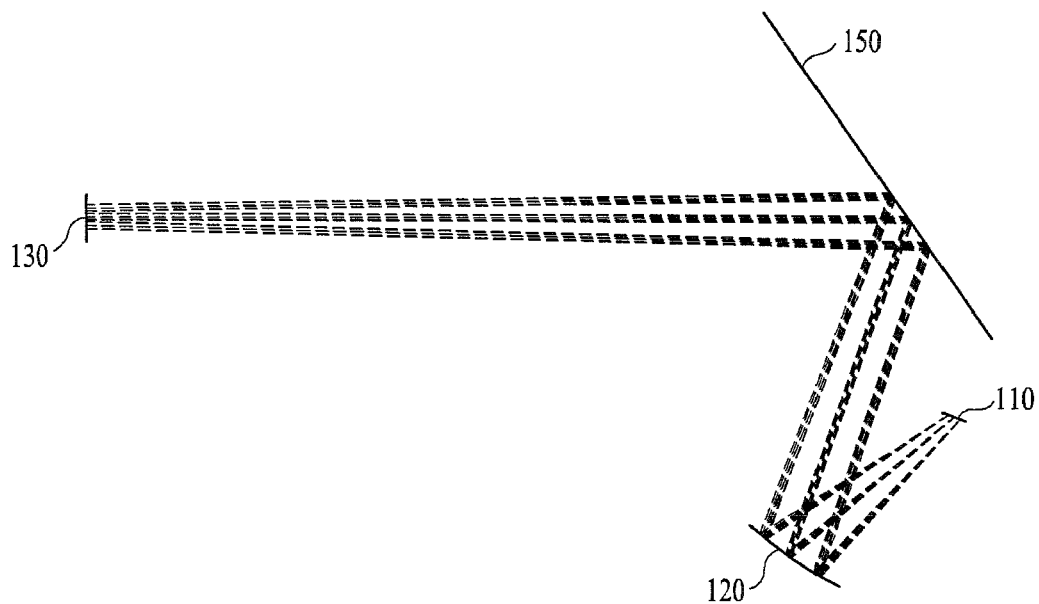
FIG. 4 is a schematic view of a display device in accordance with yet another embodiment of the present invention.

Further, as shown in FIG. 4, a second optical element 150 may be provided between the aspheric combiner 120 and the observer 130. Here, the second optical element 150 changes the route of light projected by the aspheric combiner 120. The second optical element 150 refracts or reflects light also. A compact display device can be obtained by changing the space disposition of the above-described components in the display device. In FIGs. 2 to 4, a virtual image is projected to the observer 130 through the aspheric combiner 120, but a position, at which the virtual image is substantially created, is located in the opposite direction of the observer 130 with respect to the aspheric combiner 120.

The above display device may be used as a portable display device, and particularly may be provided in a vehicle so as to display image data, such as driving data. Here, the panel 110 and the aspheric combiner 120 are separated from each other by a designated interval. The panel 110 displays the driving data of the vehicle, and the aspheric combiner 120 magnifies the driving data of the vehicle and provides a virtual image to a driver. Thus, compared with a conventional navigation device, the display device of the present invention has a simple and compact constitution and provides a virtual image without magnification and distortion.

Figure 5:
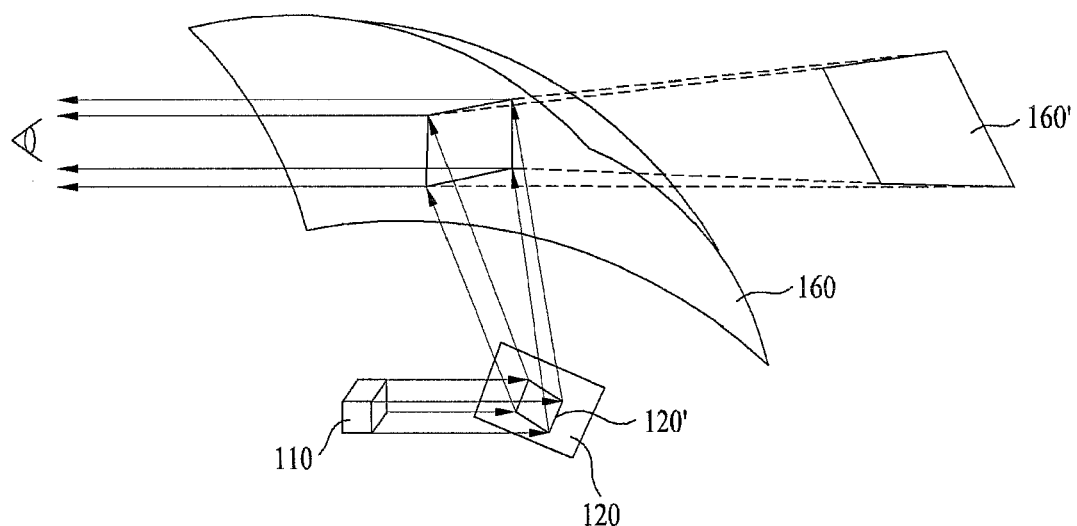
FIG. 5 is a schematic view of a display device for vehicles in accordance with one embodiment of the present invention.

FIG. 5 is a schematic view of a display device for vehicles in accordance with one embodiment of the present invention. As shown in FIG. 5, an image projected from the panel 110 creates an image 120' on the aspheric combiner 120. Thereafter, the image reflected by the aspheric combiner 120 passes through a wind shield 160, and is projected to an observer such that a virtual image 160' can be created at the outside of a vehicle. Here, the panel 110 and the aspheric combiner 120 form a single housing. Therefore, the above display device for vehicles includes respective components installed in a single housing, and thus has a compact constitution.

Preferably, a virtual image creating distance at the outside of the vehicle coincides with the visual field of a driver. The visual field of the driver varies according to individuals, but is generally fixed to 1~3 meters ahead. Further, the virtual image creating distance varies according to the size of the vehicle and a position at which the display device is located. Thus, a clear virtual image is created at the above distance by regulating the distance between the panel 110 and the aspheric combiner 120.

Here, the relations among the radius of curvature of the aspheric combiner 120, the distance between an observer (driver) and a virtual image creating position, and the distance on an optical route between the panel 110 and the aspheric combiner 120 are the same as those described above. That is, only in the case that the absolute value of a ratio of the radius of curvature of the combiner 120 to the distance between the observer and the virtual image creating position is larger than 0.01 and is smaller than 0.5, the distortion of a virtual image is minimized. Further, only in the case that the absolute value of a ratio of the distance on the optical route between the panel 110 and the combiner 120 to the radius of curvature of the combiner 120 is larger than 0 and is smaller than 1.0, the magnifying power of a virtual image is more than 10.

The above display device may be used in airplanes as well as navigation devices for vehicles. The display device causes a driver or a pilot to observe a virtual image through the glass of a driver's seat or a cockpit with the combiner, and is easy to form a large screen. Further, the above display device may be used in DMBs or monitors of computers. Moreover, the above display device for vehicles can display various moving pictures or text data, such as movies, in addition to driving data.

Figure 6:
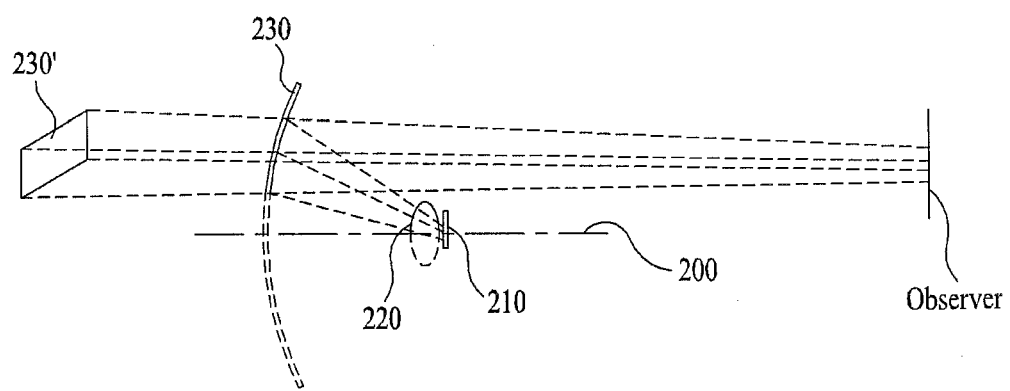
FIG. 6 is a schematic view of a head-up display device for vehicles in accordance with one embodiment of the present invention.

FIG. 6 is a schematic view of a head-up display device for vehicles in accordance with one embodiment of the present invention.

Here, a light source unit 200 includes a UHP lamp, R, G, and B LEDs, or a laser, thus emitting light. A panel 210 outputs an image corresponding to driving image data using the light generated from the light source unit 200, and is any one of emission type, transmission type, and reflection type displays.

The panel 210 displays driving image data having a resolution lower than its own resolution. Here, the panel 210 has the resolution of 800×600 of a Super Video Graphics Array (SVGA) grade or more, and the driving image data has the resolution of 640×480 of a Video Graphics Array (VGA) grade. That is, the conventional panel displays driving data using the whole resolution possessed thereby and thus fixes a visible region, but the panel 210 of the present invention displays driving data having a resolution lower than the resolution possessed thereby and thus enlarges the driver's visible region to the head-up display device.

A lens 220 magnifies and projects the driving image data displayed on the panel 210. A mirror 230 projects the driving image data, which are magnified and projected by the lens 220, to a driver, and thus creates a virtual image. Preferably, an aspheric combiner having a concave shape is used as the mirror 230. Here, the virtual image is projected by the mirror 230 and is created at the outside of a vehicle through a wind shield (not shown) of the vehicle, or is created at the outside of the vehicle by regulating the positions of the panel 210 and the mirror 230.

Although not shown in the drawings, the panel 210 and the mirror 230 are fixed to a single holder. A position, at which the wind shield and the above holder will be mounted, varies according to vehicles.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display device comprising:
    a panel, on which image data are displayed; and
    a combiner, that magnifies and reflects the image data displayed on the panel, and that has a ratio of DISC to CRC satisfying the below expression 1 and that has a ratio of CRC to DISV satisfying the below expression 2,
    wherein the expression 1 is $0<|CRC|<1$, where DISC represents a distance on an optical route between the panel and the combiner, and CRC represents a radius of curvature of the combiner,
    wherein the expression 2 is $0.01<|CRC/DISV|<0.5$, where CRC represents the radius of curvature of the combiner, and DISV represents a distance between an observer and a virtual image creating position.

2. The display device according to claim 1, wherein the combiner is an aspheric combiner.

3. The display device according to claim 1, wherein the combiner creates a virtual image corresponding to the image data displayed on the panel.

4. The display device according to claim 1, wherein a resolution of the panel differs from a resolution of the image data.

5. The display device according to claim 4, wherein the resolution of the panel is higher than the resolution of the image data.

6. The display device according to claim 5, wherein the image data has the resolution of 640×480 of a Video Graphics Array (VGA) grade, and the panel has the resolution of 800×600 of a Super Video Graphics Array (SVGA) grade or more.

7. A display device for vehicles comprising:
    a panel, on which driving data of a vehicle are displayed; and
    an aspheric combiner that magnifies the driving data displayed on the panel and creates a virtual image, and that has a ratio of DISC to CRC satisfying the below expression 1 and that has a ratio of CRC to DISV satisfying the below expression 2,
    wherein the expression 1 is $0<|DISC/CRC|<1.0$, where DISC represents a distance on an optical route between the panel and the combiner, and CRC represents a radius of curvature of the combiner,
    wherein the expression 2 is $0.01<|CRC/DISV|<0.5$, where CRC represents the radius of curvature of the combiner, and DISV represents a distance between an observer and a virtual image creating position.

8. The display device for vehicles according to claim 7, wherein the virtual image is projected by the aspheric combiner, and is created outside of the vehicle through a wind shield of the vehicle.

9. The display device for vehicles according to claim 7, wherein the virtual image is created outside of the vehicle by regulating positions of the panel and the aspheric combiner.

10. The display device for vehicles according to claim 7, wherein the panel displays a moving picture.

11. The display device for vehicles according to claim 7, further comprising:

at least one first optical element provided between the panel and the aspheric combiner, wherein the at least one first optical element refracts or reflects the driving data displayed on the panel and thus changes a traveling route of the driving data.

12. The display device for vehicles according to claim 7, further comprising a second optical element changing a traveling route of the virtual image projected by the aspheric combiner.

13. The display device for vehicles according to claim 7, wherein the virtual image is created at a position of 1 to 5 meters ahead of a driver.

14. A head-up display device for vehicles comprising:

a panel displaying driving image data of a vehicle;

a lens magnifying and projecting the driving image data displayed on the panel; and a mirror projecting the magnified and projected driving image data to a driver and creating a virtual image, wherein the panel has a resolution differing from the resolution of the driving image data, and wherein the mirror has a ratio of CRC to DISV satisfying the below expression, wherein the expression is $0.01 < |CRC/DISV| < 0.5$, where CRC represents a radius of curvature of the mirror, and DISV represents a distance between an observer and a virtual image creating position.

15. The head-up display device for vehicles according to claim 14, wherein the panel displays the driving image data having a resolution lower than its own resolution.

16. The head-up display device for vehicles according to claim 15, wherein:

the driving image data has the resolution of 640×480 of a Video Graphics Array (VGA) grade; and the panel has the resolution of 800×600 of a Super Video Graphics Array (SVGA) grade or greater.

17. The head-up display device for vehicles according to claim 14, wherein the mirror is an aspheric combiner.

18. The head-up display device for vehicles according to claim 14, wherein the virtual image is created outside of the vehicle through a wind shield of the vehicle.

* * * * *